…

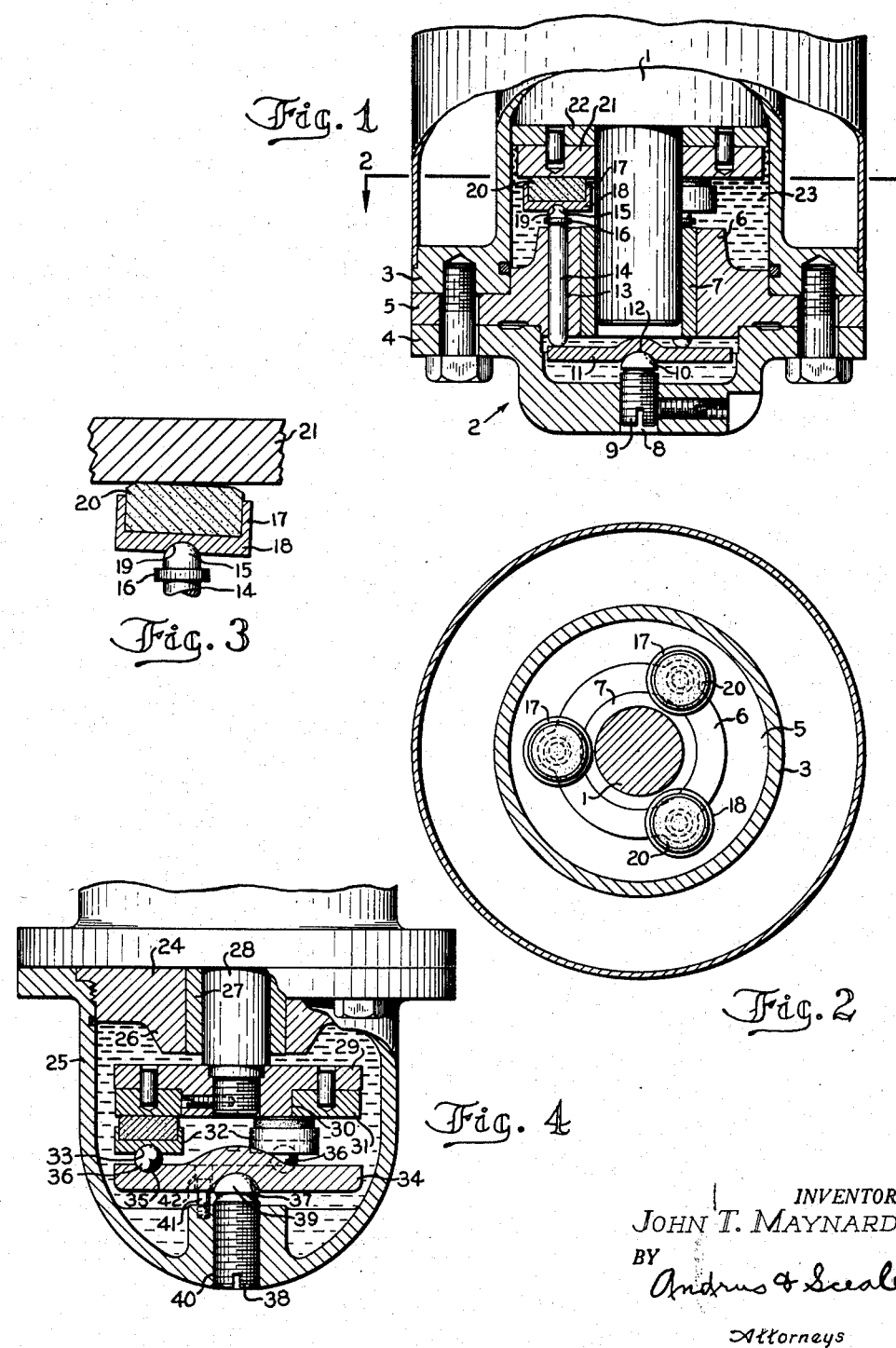

United States Patent Office 2,890,916
Patented June 16, 1959

2,890,916

THRUST BEARING

John T. Maynard, West Allis, Wis., assignor to A. O. Smith Corporation, Milwaukee, Wis., a corporation of New York Application April 2, 1956, Serial No. 575,447

1 Claim. (Cl. 308—160)

This invention relates to a thrust bearing intended to take a thrust load in the direction of the shaft journaled therein as may be employed in a submersible motor-pump unit or the like.

Generally, a thrust bearing for a rotatable shaft includes a housing wherein a plurality of thrust pads or shoes are mounted in fixed relation with respect to the housing. The shoes slidably engage a thrust collar carried by the rotating shaft to support the shaft. The bearing elements are immersed in a lubricating fluid, and in operation the lubricant is forced or wedged therebetween to minimize wear between the relatively moving parts and heating of the bearing.

According to this invention the thrust pads or shoes employed in the thrust bearing are circular and are pivotally mounted centrally thereof so that the pads or shoes may pivot with respect to the thrust collar to accommodate variations of liquid pressure acting on different portions of the shoe surface regardless of the direction of shaft rotation.

More specifically according to the invention, the thrust bearing for supporting a vertically disposed rotatable shaft includes a housing defining a bearing chamber which is at all times filed with a liquid lubricant. The housing is provided with an inwardly extending projection located centrally of the housing and receives the lower end of the shaft which is disposed in alignment with the projection and spaced upwardly therefrom. A thrust collar is fixedly secured on the shaft and rotates therewith. At least three shoe discs are spaced equidistantly from the axis of the shaft in circumferentially spaced relation and slidably engage the thrust collar to thereby support the shaft within the bearing. Each disc is pivotally supported by a ball means disposed centrally thereof so that the disc can pivot in response to the wedging action of the lubricant between the disc and the rotating collar. An equalizer plate supports the ball means and is tiltably supported on the housing projection to thereby transmit the thrust loads of the shaft to the housing and accommodate pressure variations on the individual discs due to changing alignment of the rotating shaft with respect to the housing.

The drawings furnished herewith illustrate the best mode of carrying out the invention as presently contemplated and set forth hereinafter.

In the drawings:

Figure 1 is a sectional view of the thrust bearing of this invention;

Fig. 2 is a view taken on line 2—2 of Figure 1;

Fig. 3 is a fragmentary sectional view showing the operation of one shoe disc as a result of the wedging action of the lubricant during rotation of the shaft; and Fig. 4 is a sectional view of a thrust bearing showing another embodiment of the invention.

Referring to Figure 1, a shaft 1 for a motor or the like, not shown, extends downwardly into a bearing housing 2. The bearing housing 2 is comprised of an upper annular flanged portion 3 and a flanged end cap 4 which are spaced from each other by an annular bearing retainer 5 and secured together by bolts, as shown, to form an integral housing unit.

The bearing retainer 5 is provided with an enlarged hub 6 and a bearing sleeve 7 is secured therein for receiving the lower end of shaft 1.

The housing end cap 4 is provided with a threaded opening 8 located centrally thereof and in alignment with the axis of shaft 1. An adjusting stud 9 provided with a substantially hemispherical seat 10 at the upper end thereof is threaded into opening 8 and extends into the housing.

The circular equalizer plate 11 is disposed within the housing 2 and is spaced from the wall of the housing. A recess 12 to complement seat 10 of stud 9 is provided centrally of plate 11. The equalizer plate 11 is disposed on stud 9 with the recess 12 receiving the hemispherical seat 10 so that the plate is pivotally supported within the housing 2.

The bearing retainer 5 is provided with three vertically extending holes 13 which are equidistantly spaced from the axis of shaft 1 and in equiangular relation thereto. A support rod 14 is slidably disposed in each hole 13 and the lower end thereof rests on the equalizer plate 11. Thus, the thrust loads taken by the support rods 14 are transmitted to the housing through the equalizer plate 11 and adjusting stud 9.

The support rods 14 extend upwardly through holes 13 beyond the upper surface of the bearing retainer 5 and terminate in a generally spherical seat 15. Each rod 14 is provided with a stop shoulder 16 beneath the spherical seat 15 and above the upper surface of the bearing retainer 5 to limit the sliding movement of the rod relative to the bearing retainer.

According to the invention, each rod 14 supports a circular bearing shoe or disc 17. Each bearing shoe 17 is comprised of a circular, flanged retainer 18 which is provided with a recess 19 centrally of the underside thereof to complement the spherical seat 15 on the support rod 14. A generally cylindrical carbon pad 20 having a flat or slightly convex upper surface is pressed into the retainer 18 and extends upwardly beyond the retainer wall. The upper edge of the carbon pad 20 is beveled as will be explained hereinafter. The recess 19 of each shoe 17 receives the spherical seat 15 on the support rod 14 so that the shoes are pivotally supported on the rod and may rotate about their own axes.

The annular stainless steel thrust collar 21 is secured onto the motor end ring 22 of shaft 1 for rotation therewith and slidably bears against the carbon pads 20 of shoes 17 to support the shaft within the thrust bearing. Thus, the thrust loads of the shaft 1 are transmitted to rods 14 through the collar 21 and shoes 17.

As shown in Figure 1, the housing 2 is filled with a liquid lubricant 23 so that the bearing elements are constantly immersed and provided with maximum protection against wear and heating. The lubricant 23 may be water or oil or other suitable lubricating fluid.

In operation, the thrust collar 21 rotates with the shaft 1 and slidably bears against the shoes 17. The effect of the rotation is to place a considerable pressure on the lubricant to force or wedge the same between the relatively moving collar 21 and shoes 17 to provide a film of lubricant therebetween. The shoes 17 are adapted to pivot with respect to the collar 21 in response to the wedging action of the lubricant to accommodate the variations in the pressure of the lubricant across the bearing surfaces. The beveled edge on the pads 20 of shoes 17 assists in the initial build-up of the wedging action as the shaft 1 moves from a position at rest. Because the shoes 17 are circular and pivoted centrally thereof, the wedging action of the lubricant is effective between the collar 21 and shoes 17 regardless of the direction of shaft rotation.

The thrust load of the shaft 1 is imposed on the support rods 14 through the collar 21 and shoes 17 which in turn transmit the load to the stationary bearing housing 2 through the equalizer plate 11 and adjusting stud 9. Any misalignment of the shaft 1 is reflected in pressure variations on the individual shoes 17 which move the rods 14 within bearing retainer 5 to pivot the equalizer plate 11 on the stud 9 to compensate for the misalignment. The adjustment on stud 9 is made to place the equalizer plate 11 in a position to support the rods 14 at a height where the stop shoulders 16 on the rods are removed from the surface of the radial bearing retainer 5 a somewhat greater distance than that corresponding to the amount the rods must slide within the retainer to compensate for the changing alignment.

According to the embodiment of the invention shown in Fig. 4, the annular radial bearing retainer 24 is disposed above the thrust bearing elements and is secured within the housing 25 of the motor or the like. The enlarged hub 26 of the bearing retainer 24 houses a radial bearing sleeve 27 which receives the rotatable shaft 28.

An annular thrust block 29 is secured on shaft 28 beneath the bearing retainer 24. The thrust block 29 is provided with a peripheral recess 30 for receiving the annular stainless steel thrust collar 31. The collar 31 is fixedly secured to the block 29 and rotates with shaft 28.

Three thrust shoes 32 spaced equidistantly and equiangularly from the axis of shaft 28 slidably engage collar 31 to support the shaft within housing 25. The thrust shoes 32 are constructed similarly as shoes 17 described in connection with Figure 1 and include a substantially spherical recess 33 located centrally of the underside thereof.

The equalizer plate 34 is disposed in the housing 25 beneath the thrust shoes 32 and is provided with a series of substantially spherical recesses 35 in the upper surface thereof which are disposed in vertical alignment with recesses 33 of shoes 32. The opposed recesses 35 and 33 provided in the respective shoes 32 and equalizer plate 34 respectively, have complementing radii and a ball bearing 36 of equal radius is disposed therein. The ball bearings 36 provide a pivotal mounting for the shoes 32 and maintain a spaced relation between the shoes and equalizer plate 34 so that the shoes can pivot with respect to collar 31 in response to the wedging action of the lubricant.

The equalizer plate 34 is provided with a substantially spherical recess 37 in the underside thereof in alignment with the axis of shaft 28. An adjusting stud 38 having a seat 39 at the upper end thereof is threaded through opening 40 provided in housing 25. Opening 40 is in alignment with the axis of shaft 28. The seat 39 complements recess 37 in the equalizer plate 34 and is received in the recess to support the equalizer plate to the housing. Plate 34 may pivot on the seat 39 in response to pressure variations on the individual shoes 32 due to changing alignment of the rotating shaft with respect to the housing. A pin 41 projects upwardly from the bearing housing and is loosely disposed in opening 42 of plate 34 to secure the plate against rotation on seat 39 while permitting pivotal movement of the plate with respect to the seat.

The present invention provides an improved thrust bearing wherein the thrust load of the shaft is taken by circular shoes which may individually pivot in response to the wedging action of the lubricant so that a film of lubricant is maintained between the relatively moving bearing surfaces. The improved bearing will operate equally well regardless of the direction of shaft rotation.

Various modes of carrying out the invention are contemplated as being within the scope of the following claim particularly pointing out and distinctly claiming the subject matter which is regarded as the invention.

I claim:

In combination, a vertically disposed rotatable shaft, a housing for receiving the lower end of the shaft and having an upstanding projection in alignment with the shaft, a radial bearing and a retainer therefor fixedly secured within the housing above said projection with the shaft extending into the radial bearing, said radial bearing and the retainer therefor dividing the housing into upper and lower chambers adapted to be filled with a lubricant, said retainer being provided with three holes extending vertically therethrough in equidistantly and equiangularly spaced relation with respect to the shaft and connecting the upper and lower housing chambers, a thrust collar fixedly secured on the portion of the shaft located within the upper housing chamber and rotating therewith, a support rod extending between said chambers through each of the respective holes provided in the radial bearing retainer and having a generally spherical seat at the upper end thereof, three circular shoe members provided with a generally spherical recess located centrally of the underside thereof to complement the spherical seat of the respective support rods and being pivotally disposed on each rod with the seat of the respective rods receiving the complementary recess of the corresponding shoe member, said shoe members slidably engaging the thrust collar to support the shaft and individually pivoting on their respective seats in response to the wedging action of the lubricant between the rotating collar and the shoe members, said three circular shoe members serving to absorb the entire thrust load on the shaft, and a plate member supporting the support rods and being pivotally supported on the upstanding projection in the lower housing chamber and otherwise being out of contact with the housing, said plate member transmitting the thrust load of the shaft to the housing and pivoting within the housing in response to pressure variations on the individual shoe members to compensate for changing alignment of the rotating shaft with respect to the housing.

References Cited in the file of this patent

UNITED STATES PATENTS

| | | |
|---|---|---|
| 1,207,071 | Parsons | Dec. 5, 1916 |
| 2,179,824 | Kip | Nov. 14, 1939 |
| 2,557,422 | Fieux | June 19, 1951 |
| 2,602,713 | Hatcher | July 8, 1952 |
| 2,779,637 | Schaefer | Jan. 29, 1957 |

FOREIGN PATENTS

| | | |
|---|---|---|
| 714,650 | Great Britain | Sept. 1, 1954 |